(12) United States Patent
Clemens et al.

(10) Patent No.: US 10,088,014 B2
(45) Date of Patent: Oct. 2, 2018

(54) BONDED SLICKLINE AND METHODS OF USE

(71) Applicant: Halliburton Energy Services, Inc., Houston, TX (US)

(72) Inventors: Jack Gammill Clemens, Fairview, TX (US); David Larimore, Dallas, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 270 days.

(21) Appl. No.: 14/347,333

(22) PCT Filed: Mar. 6, 2013

(86) PCT No.: PCT/US2013/029298
§ 371 (c)(1),
(2) Date: Mar. 26, 2014

(87) PCT Pub. No.: WO2014/137335
PCT Pub. Date: Sep. 12, 2014

(65) Prior Publication Data
US 2015/0021051 A1    Jan. 22, 2015

(51) Int. Cl.
| F16G 9/00 | (2006.01) |
| E21B 23/14 | (2006.01) |
| D04C 1/06 | (2006.01) |
| D07B 1/00 | (2006.01) |

(52) U.S. Cl.
CPC ............. *F16G 9/00* (2013.01); *D04C 1/06* (2013.01); *D07B 1/005* (2013.01); *E21B 23/14* (2013.01); *D07B 2201/1096* (2013.01); *D07B 2205/3025* (2013.01); *D07B 2401/207* (2013.01); *D07B 2501/20* (2013.01); *Y10T 428/2913* (2015.01);
(Continued)

(58) Field of Classification Search
CPC ........... E21B 23/14; E21B 17/00; E21B 23/00
See application file for complete search history.

(56) References Cited

U.S. PATENT DOCUMENTS

| 2,703,300 A | * | 3/1955 | Koon | ...................... F16G 11/00 |
| | | | | 156/148 |
| 3,634,972 A | * | 1/1972 | Illman | ................... B60C 9/0028 |
| | | | | 57/202 |
| 5,495,755 A | | 3/1996 | Moore | |

(Continued)

FOREIGN PATENT DOCUMENTS

| EP | 1091084 A1 | 4/2001 |
| WO | 2012112967 A1 | 8/2012 |
| WO | 2014137335 A1 | 9/2014 |

OTHER PUBLICATIONS

International Search Report and Written Opinion for PCT/US2013/029298 dated Nov. 14, 2013.

*Primary Examiner* — Giovanna C. Wright
*Assistant Examiner* — Manuel C Portocarrero
(74) *Attorney, Agent, or Firm* — McDermott Will Emery LLP (57) ABSTRACT

Disclosed is an improved tension member or slickline used in wellbore intervention operations. One exemplary tension member includes a first portion comprising a metallic material and having a distal end, a second portion comprising a non-metallic material and having a proximal end, and a joint coupling the proximal end of the second portion to the distal end of the first portion.

22 Claims, 3 Drawing Sheets

(52) U.S. Cl.
CPC .... *Y10T 428/2976* (2015.01); *Y10T 428/2978* (2015.01)

(56) References Cited

U.S. PATENT DOCUMENTS

| | | | |
|---|---|---|---|
| 7,428,927 B2* | 9/2008 | Vert | E21B 7/20 166/177.4 |
| 2006/0260739 A1 | 11/2006 | Varkey | |
| 2011/0259611 A1 | 10/2011 | Erkol et al. | |
| 2012/0018587 A1* | 1/2012 | Robinson | B29C 70/02 244/172.3 |
| 2012/0156488 A1 | 6/2012 | Curtin et al. | |
| 2014/0155783 A1* | 6/2014 | Starksen | A61M 25/0054 600/585 |

* cited by examiner

BONDED SLICKLINE AND METHODS OF USE

This application is a National Stage entry of and claims priority to International Application No. PCT/US2013/029298, filed on Mar. 6, 2013.

BACKGROUND

The present disclosure is related to wellbore operations and, in particular, to an improved tension member or slickline used in wellbore intervention operations.

Hydrocarbons are typically produced from wellbores drilled from the Earth's surface through a variety of producing and non-producing subterranean zones. The wellbore may be drilled substantially vertically or may be drilled as an offset well that has some amount of horizontal displacement from the surface entry point. A variety of servicing operations may be performed in the wellbore after it has been drilled and completed by lowering different kinds of downhole tools into the wellbore. For example, measuring instruments are commonly lowered into the wellbore to obtain various downhole measurements, such as bottom hole pressure and temperature. Various sampling devices are also commonly lowered into the wellbore to obtain fluid samples at various target zones of the subterranean formation in order to determine the exact composition of the formation fluids of interest.

Such servicing operations are typically undertaken by lowering the downhole tool into the wellbore on a tension member conveyance, such as a slickline. Slickline is a thin, non-electric cable or tension member usually made up of a single strand of metal wire. The single round strand of wire typically passes through a stuffing box and pressure-control equipment mounted on a wellhead to enable slickline operations to be conducted safely on live wellbores. After the wellbore servicing operation is completed, the downhole tool is withdrawn from the wellbore and the slickline is re-coiled back onto an adjacent wire spool or drum. In some production sites, wellbores may be very deep, for example extending more than 10,000 feet below the surface. With progressing technology, wells are getting even deeper and demands to service such deeper wells with slickline are correspondingly increasing.

Currently, slickline wellbore intervention is principally limited to metallic tension members to convey and retrieve the downhole tools between the surface and target zones of the wellbore. While such metallic tension members have been optimized over the years and are quite efficient for this service, they are rapidly reaching mechanical operating limits due to the increasing depths of drilled wellbores. With increasing wellbore depths, the weight of the metallic tension member as experienced at the surface limits the maximum run-in-hole working depth. Metallic tension members are also limited by material fatigue limits over time after being repeatedly introduced and retracted into/from the wellbore. In some servicing operations, for example, the tension member is repeatedly reciprocated within the wellbore over a short distance to create impact loads designed to carry out various mechanical procedures downhole. Such repeated stresses placed on the tension member can eventually result in the tension member reaching its fatigue limit. Accordingly, it may prove advantageous to have more robust and lightweight tension members for use in slickline wellbore intervention operations.

SUMMARY OF THE DISCLOSURE

The present disclosure is related to wellbore operations and, in particular, to an improved tension member or slickline used in wellbore intervention operations.

In some embodiments, a tension member is disclosed and may include a first portion comprising a metallic material and having a distal end, a second portion comprising a non-metallic material and having a proximal end, and a joint coupling the proximal end of the second portion to the distal end of the first portion.

In other embodiments, a method for introducing a downhole tool into a wellbore may be disclosed. The method may include coupling the downhole tool to an end of a slickline having at least a first portion made of a metallic material and a second portion made of a first non-metallic material coupled to the first portion at a first joint, placing the downhole tool in a lubricator coupled to a wellhead of the wellbore, the lubricator having a stuffing box through which the slickline is extended and sealed, and conveying the downhole tool into the wellbore by feeding the slickline through the stuffing box.

The features of the present disclosure will be readily apparent to those skilled in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure is related to wellbore operations and, in particular, to an improved tension member or slickline used in wellbore intervention operations.

The present disclosure provides exemplary tension members or "slicklines" constructed of two or more types of materials in order to decrease the gross weight of the slickline but nonetheless maintain a robust well intervention conveyance means. As used herein, the term "tension member" refers not only to slicklines, as generally known in the oil and gas industry, but also refers to any type of line or conveyance that may be extended into a wellbore. For example, exemplary tension members may or may not include power/data conduits. Tension members may include electric lines (i.e., e-lines) or lines that are braided or otherwise weaved. Accordingly, the terms "tension member" and "slickline" are used herein interchangeably and should not be considered as limiting the scope of the present disclosure by referring solely to "slicklines," per se.

A portion of the exemplary slicklines disclosed herein may be constructed of industry standard metallic materials, such as steel and the like. The metallic portion of the slickline, however, may be bonded or otherwise coupled to one or more lengths of lighter, non-metallic materials, thereby reducing the overall weight of the slickline. As will be appreciated, the exemplary slicklines disclosed herein may prove advantageous in providing a lighter slickline that may be as strong or stronger than typical all-metal slicklines. As a result, such multi-material slicklines may be able to sustain increased working loads downhole and allow well operators to service wellbores that continue to be drilled to deeper and deeper working depths.

Figure 1:
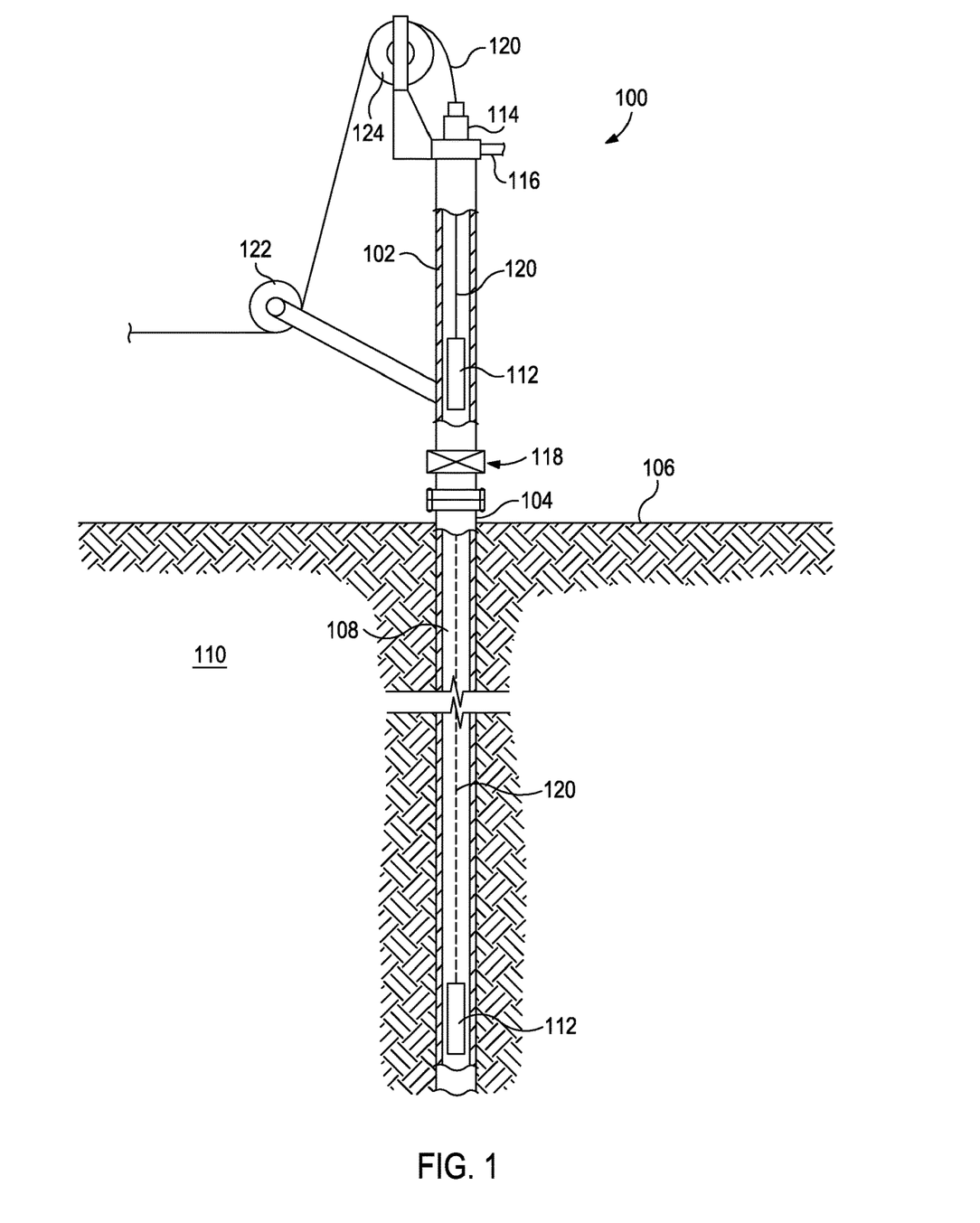
FIG. 1 is a wellbore system that embodies the principles of the present disclosure, according to one or more embodiments.

Referring to FIG. 1, illustrated is an exemplary wellbore system 100 that may embody one or more principles of the present disclosure, according to one or more embodiments. The system 100 may include a lubricator 102 operatively coupled to a wellhead 104 installed at the surface 106 of a wellbore 108. As illustrated, the wellbore 108 extends from the surface 106 and penetrates a subterranean formation 110 for the purpose of recovering hydrocarbons therefrom. While shown as extending vertically from the surface 106 in FIG. 1, it will be appreciated that the wellbore 108 may equally be deviated, horizontal, and/or curved over at least some portions of the wellbore 108, without departing from the scope of the disclosure. The wellbore 108 may be cased, open hole, contain tubing, and/or may generally be characterized as a hole in the ground having a variety of shapes and/or geometries as are known to those of skill in the art. Furthermore, it will be appreciated that embodiments disclosed herein may be employed in surface (e.g., land-based) or subsea wells.

The lubricator 102 may be coupled to the wellhead 104 using a variety of known techniques, such as a clamped or bolted connection. Moreover, additional components (not shown), such as a tubing head and/or adapter, may be positioned between the lubricator 102 and the wellhead 104. The lubricator 102 may be an elongate, high-pressure pipe or tubular configured to provide a means for introducing a downhole tool 112 into the wellbore 108 in order to undertake a variety of servicing operations within the wellbore 108. The top of the lubricator 102 may include a stuffing box 114 fluidly coupled to a high-pressure grease-injection line 116 used to introduce grease or another type of sealant into the stuffing box 114 in order to generate a seal. The lower part of the lubricator 102 may include one or more valves 118, such as an isolating valve or swab valve.

A tension member or slickline 120 may be extended into the lubricator 102 via the stuffing box 114 and attached at one end to the downhole tool 112. The slickline 120 may generally provide a conveyance used to transport the downhole tool 112 into the wellbore 108 such that the desired wellbore servicing operations can be undertaken. The slickline 120 is generally fed to the lubricator 102 from a spool or drum (not shown) and through one or more sheaves 122, 124 before being introduced into the stuffing box 114 which provides a seal about the slickline 120 as it slides into the lubricator 102. Those skilled in the art will readily recognize that the arrangement and various components of the lubricator 102 and the wellhead 104 are described merely for illustrative purposes and therefore should not be considered limiting to the present disclosure. Rather, many variations of the lubricator 102 and the wellhead 104 may be had, without departing from the scope of the disclosure.

In some applications, the wellbore 108 may be drilled or otherwise extend to extreme depths, such as depths reaching 25,000 feet or greater. In such applications, the overall weight of the slickline 120 as extended from the surface 106 may become operationally prohibitive for desired wellbore 108 operations. As such, conventional slicklines 120 may not be able to service wellbores 108 beyond certain depths without risking tensile or fatigue failure. According to embodiments disclosed herein, however, a slickline may be manufactured or otherwise made of two or more types of materials in an effort to decrease the gross weight of the slickline and thereby increase its working depth potential and overall payload capacity.

Figure 2A:
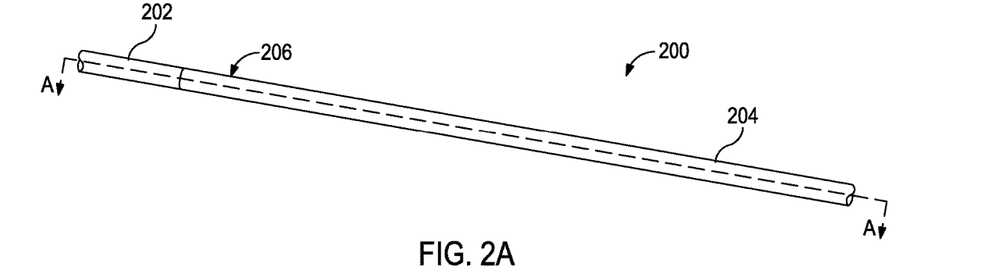
FIG. 2A illustrates an isometric view of a portion of an exemplary slickline, according to one or more embodiments.
Figure 2B:
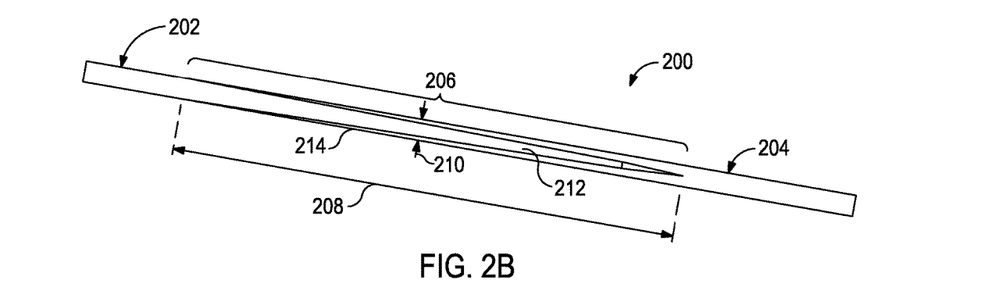
FIG. 2B illustrates a cross-sectional isometric view of the portion of the slickline of FIG. 2A as taken along lines A-A.

Referring to FIGS. 2A and 2B, for example, illustrated are isometric views of a portion of an exemplary tension member or slickline 200, according to one or more embodiments of the disclosure. Specifically, FIG. 2A illustrates an isometric view of a portion of the slickline 200 and FIG. 2B illustrates a cross-sectional isometric view of the portion of the slickline 200 as taken along lines A-A of FIG. 2A. As illustrated, the slickline 200 may include at least a first portion 202 and a second portion 204 coupled together at a joint 206 (FIG. 2B). As will be discussed in greater detail below, the joint 206 may be configured as a transition point where the slickline 200 transitions between the first and second portions 202, 204. While only showing a portion of the slickline 200 in FIGS. 2A and 2B (and the remaining figures discussed herein), those skilled in the art will readily recognize that the first and second portions 202, 204 of the slickline 200 may extend in opposing directions several thousands of feet. Moreover, it is further contemplated herein, without departing from the scope of the disclosure, that the slickline 200 may or may not include power/data lines extending therein or therewith in order to provide communication from the surface 106 (FIG. 1) to any downhole tools or devices.

In one or more embodiments, the first portion 202 may be made of metal or a metallic material. For example, the first portion 202 may be made of metals such as, but not limited to, steel, plow steel, stainless steel, INCONEL®, carbon steel, alloy steel (e.g., non-carbon steel alloys), spring steel, maraging steel, weathering steel, tool steel, combinations thereof, and the like.

The second portion 204, however, may be made of one or more non-metal or non-metallic materials, or any other high strength material that is lighter in weight than the metallic first portion 202. For example, the second portion 204 may be made of lightweight non-metallic materials including, but not limited to, plastics (e.g., polymers, thermoplastics, resins, and the like), composite materials, combinations thereof, and the like. In at least one embodiment, the second portion 204 may be a braided tension member or line, with or without power/data lines extending therein or therewith. Accordingly in at least one embodiment, the first portion 202 of the slickline 200 may be a solid metallic tension member, and the second portion 204 may be a braided tension member, and power/data lines may or may not extend therein along the length of the slickline 200.

In some embodiments, suitable plastics or polymers that may be used for the second portion 204 include, but are not limited to, polyamides, polyimides, acetal copolymers, polybenzimidazoles, polyetheretherketones (PEEK), polyetherimides, nylons, polyesters, polysulphones, polyphenylenesulphones, polyphenylene sulphides, polymethylmethacralytes, polycarbonates, polyvinylchlorides (PVC), polyviylidenefluorides, polytetrafluoroethylenes (PTFE), polyethylenes, polypropylenes, glass epoxies, glass silicones, epoxy resins, phenol resins, polybenzoimidazole resins, benzoxazine resins, cyanate ester resins, unsaturated polyester resins, vinyl ester resins, urea resins, melamine resins, bismaleimide resins, polyimide resins and polyamideimide resins, polyolefin resins, styrene-based resins, polyoxymethylene resin, polyamide resins, polyurethane resins, polyurea resins, polydicyclopentadidene resin, polycarbonate resins, polymethylene methacrylate resin, polyetherimide resins, polysulfone resins, polyallylate resins, polyether sulfone resins, polyketone resins, polyether ketone resins, polyether ether ketone resins, polyether ketone ketone resins, polyarylate resins, polyether nitrile resins, polyimide resins, polyamideimide resins, phenol resins, phenoxy resins, fluorine-based resins such as polytetrafluoroethylene resin, elastomers (e.g., butadiene acrylonitrile, its carboxylic acid or amine modification products, fluoroelastomers, polysiloxane elastomers), rubbers (butadiene, styrene butadiene, styrene butadiene styrene, styrene isoprene styrene, natural rubber, etc.), resins for RIM (e.g., those containing a catalyst or the like capable of forming polyamide 6, polyamide 12, polyurethane, polyurea or polycicyclopentadiene), cyclic oligomers (those containing a catalyst or the like capable of forming a polycarbonate resin, polybutylene terephthalate resin, etc.), the copolymers and modification products thereof, resins or plastics obtained by blending two or more of the foregoing, and the like.

In some embodiments, suitable composite materials that may be used for the second portion 204 include, but are not limited to, any of the aforementioned plastics or polymers reinforced with carbon fiber, carbon nanotubes, glass fibers, fiberglass, polymer fibers (e.g., KEVLAR®), metal fibers, ceramic fibers, combinations thereof, and the like.

In the illustrated embodiment, the first portion 202 may be configured or otherwise characterized as the "upper" portion of the slickline 200 and the second portion 204 may be configured or otherwise characterized as the "lower" portion of the slickline 200. In other words, the second portion 204 of the slickline 200 may be configured to be introduced into the wellbore 108 (FIG. 1) first as the slickline 200 is deployed from its spool or drum (not shown), and the first portion 202 follows the second portion 204 as being coupled thereto via the joint 206. Such a configuration may prove advantageous in that the lightweight, non-metallic second portion 204 may be extended into the wellbore 108 (FIG. 1) first and thereby transmit less tensile stress to the slickline 200 as a whole due to material weight as compared to a tension member having its entire length made of metal (e.g., steel). As a result, the slickline 200 may be extended into the wellbore 108 to even further depths without jeopardizing the integrity of the slickline 200 due to tensile fatigue.

It should be noted, however, that the arrangement of the first and second portions 202, 204 may be switched or otherwise swapped without departing from the scope of the disclosure. In other words, in at least one embodiment, the first portion 202 may be configured to be introduced into the wellbore 108 (FIG. 1) first as the slickline 200 is deployed from its spool or drum (not shown), and the second portion 204 may follow the first portion 202 as being coupled thereto via the joint 206. Such an embodiment may still prove advantageous since the overall weight of the slickline 200 is nonetheless reduced by having at least a portion thereof manufactured from a lightweight material.

The ratio between the first and second portions 202, 204 along the entire length of the slickline 200 may vary, depending on the particular application or the parameters of the specific wellbore service that is desired. For example, in some embodiments, the first portion 202 may encompass about 80% of the entire length of the slickline 200 while the second portion 204 may encompass the remaining 20%. In other embodiments, however, the ratio between the lengths of the first and second portions 202, 204 may be 90/10, 70/30, 60/40, 50/50, 40/60, 30/70, 20/80, 10/90, and/or any intermediate ratio therebetween. Those skilled in the art will readily recognize that the ratio between the lengths of the first and second portions 202, 204 may be any ratio required for the particular job at hand. Accordingly, the ratios stated herein are merely for illustrative purposes and should not be considered limiting to the present disclosure.

In some embodiments, the specific ratio between the first and second portions 202, 204 may be dependent, at least in part, on the specific borehole geometry of the wellbore where the slickline 200 is to be deployed. For example, depending on the curvature of the wellbore, and the effect such curvature may have on friction and transferred weight of the slickline 200, the ratio between the length of the first and second portions 202, 204 may be optimized such that the weight-offsetting second portion 204 is optimally sized for the required task. Such a determination may be made using known wellbore geometries in conjunction with one or more mathematical algorithms configured to take into account the material properties of both the first and second portions 202, 204. Accordingly, in at least one embodiment, mathematical modeling could optimize the ratio of metallic/non-metallic materials in the design of the slickline 200.

As briefly mentioned above, the joint 206 may be configured to provide a transition point between the first and second portions 202, 204 along the length of the slickline 200. The joint 206 may further be configured to prevent stress risers from occurring over this transition point. To accomplish this, the joint 206 may extend across or otherwise encompass a length 208 of the slickline 200 sufficient to distribute both tensile and compressive stresses that may be sustained by the slickline 200 across this transition point, thereby minimizing fatigue potential over the joint 206. As will be appreciated, the length 208 of the joint 206 may vary depending on several factors including, but not limited to, the overall length of the slickline 200, the intended purpose of the slickline (e.g., what wellbore servicing operation will be undertaken), the wellbore geometry, the materials of each of the first and second portions 202, 204, combinations thereof, and the like.

The joint 206 may also be configured to securely couple, attach, or otherwise bond the first portion 202 to the second portion 204 such that the strength of the joint 206 is generally uniform across its length 208 and as strong as, if not stronger than, the remaining portions of the slickline 200. In some embodiments, the second portion 204 may be coupled to the first portion 202 using one or more mechanical fasteners such as rivets, pins, screws, bolts (e.g., two-piece bolts, etc.), blind fasteners, combinations thereof, and the like. Such mechanical fasteners may be made of, for example, titanium, stainless steel, and aluminum.

In other embodiments, the second portion 204 may be coupled to the first portion 202 using one or more bonding techniques, such as metal-to-composite bonding techniques (e.g., resin transfer molded processes), temperature cure processing, UV cure processing, combinations thereof, and the like. In yet other embodiments, the second portion 204 may be coupled to the first portion 202 using one or more adhesives such as, but not limited to, epoxies, acrylics, and urethanes. In other embodiments, the second portion 204 may be coupled to the first portion 202 using mechanical and/or hydraulic pressure bonding techniques, as known in the art.

In even further embodiments, the joint 206 may be braided or otherwise interwoven using one or both of the materials of the first and/or second portions 202, 204. For instance, in at least one embodiment, the non-metallic material of the second portion 204 at the joint 206 may consist of numerous strands of the non-metallic material that may be wound or otherwise braided onto the first portion 202 over the length 208 of the joint 206. In such embodiments, the second portion 204 may be, for example, a braided tension member, as known by those skilled in the art. In other embodiments, the materials of both the first and/or second portions 202, 204 may consist of numerous strands that may be interwoven with each other over the length 208 of the joint 206. In such embodiments, the slickline 200 may or may not include power/data conduits, as briefly mentioned above. It will be appreciated that any combination of the aforementioned means for coupling the second portion 204 to the first portion 202 is also contemplated herein as falling within the scope of this disclosure.

Regardless of the means for coupling the second portion 204 to the first portion 202, the joint 206 may further be configured to provide a substantially constant outside diameter 210 across its length 208. Moreover, the diameter 210 of the joint 206 may be configured to be substantially similar to the outside diameter of the remaining portions of the slickline 200 (e.g., the first and second portions 202, 204). This may prove advantageous in allowing the joint 206 to traverse certain sealing points that the slickline 200 may be required to traverse, such as the stuffing box 114 of the lubricator, as illustrated in FIG. 1.

The particular configuration of the joint 206 may vary, without departing from the scope of the disclosure, while nonetheless providing a secure coupling between the first and second portions 202, 204. For example, as illustrated in FIG. 2B, a distal end 212 of the first portion 202 may gradually taper along at least a portion of the length 208 and a proximal end 214 of the second portion 204 may be configured to receive or otherwise envelop the tapering distal end 212. In one or more embodiments, the proximal end 214 of the second portion 204 may be repeatedly wrapped around the exterior surface of the distal end 212 of the first portion 202 in order to secure the second portion 204 to the first portion 202. In some embodiments, as illustrated, the tapering distal end 212 of the first portion 202 may be a smooth cone-shaped taper. In other embodiments, however, the shape and configuration of the tapering distal end 212 of the first portion 202 and the overall interconnection between the distal end 212 and the proximal end 214 of the second portion 204 may vary, as depicted in the following exemplary figures.

Figure 3A:
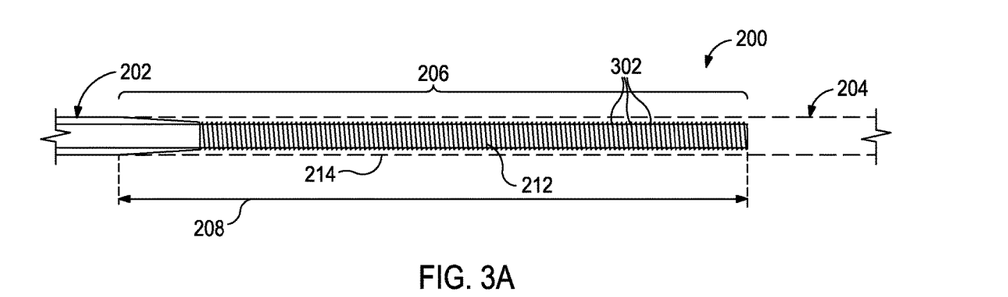
FIGS. 3A-3C depict exemplary variations of a joint between first and second portions of an exemplary slickline, according to one or more embodiments.
Figure 3B:
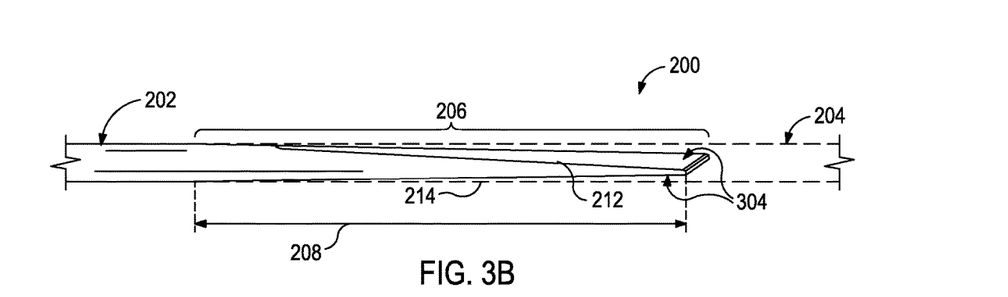
Figure 3C:
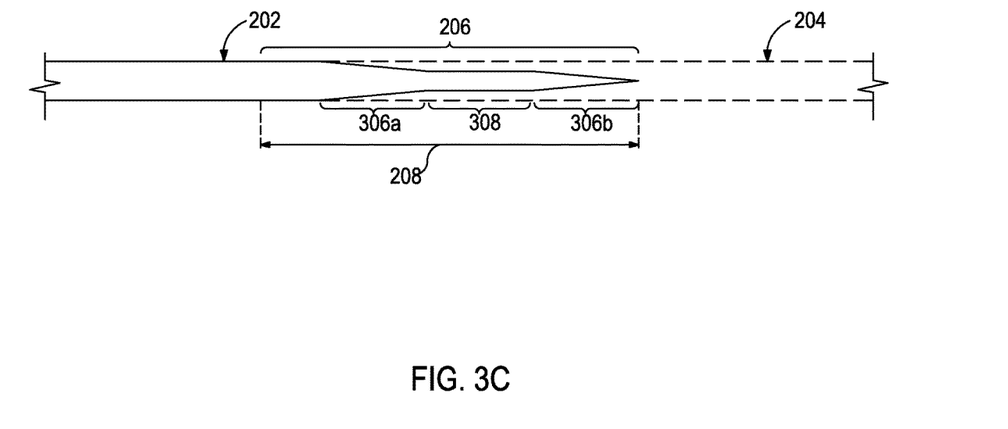

Referring to FIGS. 3A, 3B, and 3C, for example, with continued reference to FIGS. 2A-2B, illustrated are exemplary variations of the joint 206 between the first and second portions 202, 204 of the slickline 200, according to one or more embodiments. In FIG. 3A, for example, the distal end 212 of the first portion 202 may define a series of grooves 302 extending along at least a portion of the length 208. The grooves 302 may be any type of serration or irregularity defined or otherwise formed in the outer surface of the distal end 212 of the first portion 202. As will be appreciated, the grooves 302 may help provide an amount of separation resistance once the proximal end 214 of the second portion 204 is properly secured or otherwise bonded to the distal end 212 of the first portion 202.

In some embodiments, the grooves 302 may include helical or non-helical threading, such as is illustrated. In other embodiments, however, the grooves 302 may include saw-tooth edges or tooth-type ridges similar to the teeth of a file, and may include coarse, exaggerated, or smooth teeth profiles, without departing from the scope of the disclosure. In some embodiments, the grooves 302 may extend circumferentially about the entire outer surface of the distal end 212, but in other embodiments the grooves 302 may extend only partially about the distal end 212. In at least one embodiment, axially-spaced clusters or groups (not shown) of the grooves 302 may be defined along the distal end 212 and separated by, for example, corresponding smooth portions of the distal end 212. Those skilled in the art will readily recognize the several variations of clusters of grooves 302 and smooth portions that may be had, without departing from the scope of the disclosure.

In FIG. 3B, the distal end 212 of the first portion 202 may include or otherwise define a smooth flat taper configured to be received within or otherwise wrapped by the proximal end 214 of the second portion 204. As illustrated, the distal end 212 may be tapered and thereby define at least two mutually tapering surfaces 304 (two shown in FIG. 3B). In other embodiments, the distal end 212 may include more than two mutually tapering surfaces 304, without departing from the scope of the disclosure.

In FIG. 3C, the distal end 212 of the first portion 202 may taper along the length 208 in more than one location. In particular, the distal end 212 may include a first tapering section 306a and a second tapering section 306b separated by a straight (e.g., non-tapering) section 308. While only two tapering sections 306a,b and one straight section 308 are depicted in FIG. 3C, it will be appreciated that more than two tapering sections 306a,b and one straight section 308 may be defined on the distal end 212, without departing from the scope of the disclosure. Indeed, in at least one embodiment, the distal end 212 may define a series of tapering sections 306a,b separated or otherwise interposed by corresponding straight sections 308.

Those skilled in the art will readily recognize that the various features and configurations of the joint 206 depicted in FIGS. 3A-3C could be combined in order to enhance the bonding between the first and second portions 202, 204. Indeed, the grooves 302 of FIG. 3A may be used in either of the embodiments depicted in FIG. 3B or 3C in order to increase the separation resistance of the joint 206.

Figure 4:
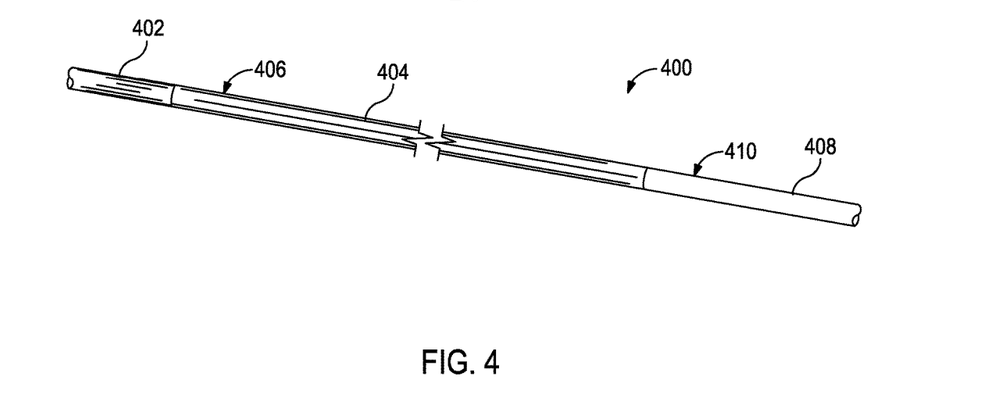
FIG. 4 illustrates an isometric view of a portion of another exemplary slickline, according to one or more embodiments of the disclosure.

Referring now to FIG. 4, illustrated is an isometric view of a portion of another exemplary slickline 400, according to one or more embodiments of the disclosure. The slickline 400 may be similar in some respects to the slickline 200 of FIGS. 2A-2B and 3A-3C and therefore will be best understood with reference thereto. Similar to the slickline 200, the slickline 400 may include a first portion 402 and a second portion 404 coupled or otherwise bonded together at a first joint 406. The slickline 400, however, may further include a third portion 408 coupled or otherwise bonded to a distal end of the second portion 404 at a second joint 410. The first and second joints 406, 410 may be similar to the joint 206 described above in FIGS. 2A-2B and 3A-3C, and therefore will not be discussed in detail. It should be noted, however, that braiding or otherwise interweaving the materials that make up the first and/or second joints 406, 410 is further contemplated herein, as generally described above. Moreover, any of the portions of the slickline 400 made of a non-metallic material may be a braided tension member, and power/data lines may or may not extend through the slickline 400.

The materials that make up the first, second, and third portions 402, 404, 408 may vary depending on the application and wellbore constraints. In some embodiments, for example, the first portion 402 may be made of a metal or a metallic material, as generally defined above, and the second portion 404 may be made of a lightweight, non-metallic material, as also generally defined above. The third portion 408, however, may be made of a metallic or non-metallic material and may be a different metallic or non-metallic material than the first or second portions 402, 404. In other embodiments, any of the first, second, or third portions 402, 404, 408 may be made of a metallic or non-metallic material. Moreover, those skilled in the art will readily appreciate that while FIG. 4 depicts three portions 402, 404, 408, the slickline 400 may equally include more than three portions 402, 404, 408, without departing from the scope of the disclosure.

In at least one embodiment, the non-metallic material that may make up either the second or third portions 404, 408 may include an elastomer or elastomeric material that may be configured to provide a measure of elastic spring effect for various downhole impact applications and the like. Suitable elastomeric materials that may be used include, but are not limited to, natural polyisoprene, synthetic polyisoprene, polybutadiene, chloroprene rubber, polychloroprene, neoprene, baypren, butyl rubber, halogenated butyl rubbers, styrene-butadiene rubber, nitrile rubber (e.g., hydrogenated nitrile rubbers (HNBR) Therban and Zetpol), ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, thermoplastic elastomers, resilin, elastin, polysulfide rubber, combinations thereof, and the like.

In exemplary operation, the elastomer that makes up either the second or third portions 404, 408 may be configured to stretch in tension and, when released, simulate an accelerometer-type effect to accentuate jarring motions within the wellbore. Those skilled in the art will readily appreciate that such spring effect could advantageously be used with detent jars, for example, and the elastomeric material could be used as a type of accelerator to enhance the impact force of the detent jar. The length of the elastomeric material could range depending on the application and on the specific coefficient of elasticity exhibited by the chosen elastomeric material.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A tension member, comprising:
   a first portion comprising a metallic material having a distal end comprising at least one groove formed in an outer surface of the distal end; and
   a second portion comprising a non-metallic material having a proximal end, wherein an inner surface of the proximal end of the second portion is directly connected to the at least one groove on the outer surface of the distal end of the first portion at a joint comprising a transition point between the first portion and the second portion.

2. The tension member of claim 1, wherein the metallic material is selected from the group consisting of steel, plow steel, stainless steel, INCONEL®, carbon steel, alloy steel, spring steel, maraging steel, weathering steel, and tool steel.

3. The tension member of claim 1, wherein the non-metallic material comprises at least one of a plastic, a composite, and an elastomer.

4. The tension member of claim 3, wherein the composite comprises a polymer reinforced with one or more of carbon fibers, carbon nanotubes, glass fibers, fiberglass, polymer fibers, metal fibers, ceramic fibers, and combinations thereof.

5. The tension member of claim 1, wherein the joint is formed using at least one of a metal-to-composite binding technique, a temperature cure processing, a UV cure processing, a mechanical bonding technique, a hydraulic pressure bonding technique, and an adhesive, or any combination thereof.

6. The tension member of claim 1, wherein the joint comprises braiding the proximal end of the second portion onto the distal end of the first portion.

7. The tension member of claim 1, wherein the distal end of the first portion tapers along at least a portion of the joint.

8. The tension member of claim 7, wherein the at least one groove comprises a series of grooves defined along at least a portion of the outer surface of the distal end.

9. The tension member of claim 8, wherein the series of grooves are defined helically or non-helically along the portion of the outer surface of the distal end.

10. The tension member of claim 1, wherein the distal end of the first portion defines at least two mutually tapering portions that taper along at least a portion of the joint.

11. The tension member of claim 10, further comprising a series of grooves defined along at least a portion of an outer surface of the distal end.

12. The tension member of claim 1, wherein the joint is a first joint and the non-metallic material is a first non-metallic material, the tension member further comprising a third portion made of a second non-metallic material and directly connected to the second portion at a second joint.

13. The tension member of claim 12, wherein the first and second non-metallic materials are least one of a plastic, a composite, and an elastomer.

14. The tension member of claim 13, wherein the composite comprises a polymer reinforced with one or more of carbon fibers, carbon nanotubes, glass fibers, fiberglass, polymer fibers, metal fibers, ceramic fibers, and combinations thereof.

15. The tension member of claim 13, wherein one or both of the first and second joints are braided joints.

16. A method for introducing a downhole tool into a wellbore, comprising:
coupling the downhole tool to an end of a slickline, wherein the slickline has at least a first portion made of a metallic material and a second portion made of a first non-metallic material disposed length wisely adjacent to the first portion of the metallic material along a length of the slickline, and wherein a proximal end of the second portion is directly connected to a distal end of the first portion at a first joint, wherein the distal end comprises at least one groove formed in an outer surface of the distal end;
placing the downhole tool in a lubricator coupled to a wellhead of the wellbore, the lubricator having a stuffing box through which the slickline is extended and sealed; and
conveying the downhole tool into the wellbore by feeding the slickline through the stuffing box.

17. The method of claim 16, further comprising:
feeding the first joint through the stuffing box; and
maintaining a seal on the slickline as the first joint passes through the stuffing box.

18. The method of claim 16, wherein the first non-metallic material is at least one of a plastic, a composite, and an elastomer.

19. The method of claim 18, wherein the composite is selected from the group consisting a polymer reinforced with one or more of carbon fibers, carbon nanotubes, glass fibers, polymer fibers, metal fibers, ceramic fibers, and combinations thereof.

20. The method of claim 16, wherein the slickline further comprises a third portion made of a second non-metallic material and directly connected to the second portion at a second joint, the method further comprising:
feeding the first and second joints through the stuffing box, the first and second joints exhibiting respective outside diameters substantially similar to that of the first, second, and third portions; and
maintaining a seal on the slickline as the first and second joints pass through the stuffing box.

21. The method of claim 20, wherein the first and second non-metallic materials are least one of a plastic, a composite, and an elastomer.

22. The method of claim 21, wherein the composite is selected from the group consisting a polymer reinforced with one or more of carbon fibers, carbon nanotubes, glass fibers, polymer fibers, metal fibers, ceramic fibers, and combinations thereof.

\* \* \* \* \*